(12) United States Patent
Karukka et al.

(10) Patent No.: US 7,797,641 B2
(45) Date of Patent: Sep. 14, 2010

(54) MOBILE COMMUNICATIONS TERMINAL AND METHOD THEREFORE

(75) Inventors: Minna Karukka, Oulu (FI); Seppo Helle, Paimio (FI); Katja Leinonen, Tampere (FI); Jussi-Pekka Kekki, Tampere (FI); Antti V. Sinnemaa, Tampere (FI); Juha M. Pusa, Kangasala (FI); Wang Kongqiao, Beijing (CN); Tao Rong, Hangzhou (CN); Seppo O. Hämäläinen, Beijing (CN)

(73) Assignee: Nokia Corporation, Espoo (FI)

( * ) Notice: Subject to any disclaimer, the term of this patent is extended or adjusted under 35 U.S.C. 154(b) by 289 days.

(21) Appl. No.: 11/140,490

(22) Filed: May 27, 2005

(65) Prior Publication Data

US 2006/0268100 A1 Nov. 30, 2006

(51) Int. Cl.
*G06F 3/048* (2006.01)

(52) U.S. Cl. .................. 715/802; 715/739; 715/768; 715/838; 715/851

(58) Field of Classification Search .............. 715/730, 715/739, 757, 767, 776, 782, 783, 784, 786, 715/787, 790, 802, 838, 850, 851, 852
See application file for complete search history.

(56) References Cited

U.S. PATENT DOCUMENTS

| | | | | |
|---|---|---|---|---|
| 5,786,820 | A * | 7/1998 | Robertson | 715/853 |
| 5,880,733 | A * | 3/1999 | Horvitz et al. | 715/850 |
| 6,266,098 | B1 * | 7/2001 | Cove et al. | 348/563 |
| 6,411,307 | B1 | 6/2002 | Rosin et al. | 345/716 |
| 6,466,237 | B1 * | 10/2002 | Miyao et al. | 715/838 |
| 6,515,656 | B1 | 2/2003 | Wittenburg et al. | |

(Continued)

FOREIGN PATENT DOCUMENTS

EP 1 148 412 A2 10/2001

(Continued)

OTHER PUBLICATIONS

Microsoft Corporation, Windows XP Picture and Fax Viewer, 2002, Microsoft Corporation, Figures 1 and 2.*

(Continued)

*Primary Examiner*—Sara England
*Assistant Examiner*—John Heffington

(57) ABSTRACT

A mobile terminal has a controller, a display and an input device connected to the controller, and a digital object browser for browsing among a plurality of available digital objects. A first representation and a second representation of each of the digital objects are presentable on a display screen. The first representations of the digital objects are presented along a predefined path on the display screen, the first representation of a focused one of the digital objects being shown in a focus area on the display screen. For the focused digital object, the second representation thereof is presented in a preview area on the display screen. In response to a user input given on the input device, a desired scrolling operation is performed among the first representations presented, thereby shifting the positions of the first representations on the display screen along the path accordingly, updating the focus area to reflect a change in focus from the focused digital object to another digital object by presenting in the focus area the first representation of the other digital object, as well as updating the preview area correspondingly by presenting therein the second representation of the other digital object.

32 Claims, 8 Drawing Sheets

U.S. PATENT DOCUMENTS

| | | | |
|---|---|---|---|
| 6,577,330 B1 * | 6/2003 | Tsuda et al. | 715/782 |
| 6,633,308 B1 * | 10/2003 | Ono et al. | 715/723 |
| 6,990,637 B2 * | 1/2006 | Anthony et al. | 715/851 |
| 7,013,435 B2 * | 3/2006 | Gallo et al. | 715/850 |
| 7,091,998 B2 * | 8/2006 | Miller-Smith | 715/810 |
| 7,263,667 B1 * | 8/2007 | Hoellerer et al. | 715/782 |
| 2002/0033848 A1 * | 3/2002 | Sciammarella et al. | 345/838 |
| 2004/0169688 A1 | 9/2004 | Burdick | |
| 2004/0261031 A1 | 12/2004 | Tuomainen et al. | |
| 2005/0091596 A1 | 4/2005 | Anthony et al. | |
| 2005/0160373 A1 | 7/2005 | Chakravarty | |
| 2005/0289482 A1 * | 12/2005 | Anthony et al. | 715/851 |
| 2006/0174211 A1 * | 8/2006 | Hoellerer et al. | 715/782 |
| 2007/0067736 A1 * | 3/2007 | Aaltonen | 715/810 |
| 2008/0034381 A1 | 2/2008 | Jalon et al. | |
| 2008/0062141 A1 | 3/2008 | Chandhri | |
| 2008/0098311 A1 * | 4/2008 | Delarue et al. | 715/739 |
| 2009/0204920 A1 * | 8/2009 | Beverley et al. | 715/768 |

FOREIGN PATENT DOCUMENTS

| | | |
|---|---|---|
| JP | 2003330587 | 11/2003 |
| SE | 521 470 | 11/2003 |
| WO | WO 02/39712 | 5/2002 |
| WO | WO 2004/023283 | 3/2004 |
| WO | WO 2004/023283 A1 | 3/2004 |
| WO | WO 2004/104773 A2 | 12/2004 |

OTHER PUBLICATIONS

Philips Fisio 820—Full phone specifications, RCS Rampal Cellular Stockmarket, www.rampal.com, pp. 1-2, Apr. 19, 2005.

Philips Xenium 9@9, Specifications, instruction manual, photos, www.cellular-news.com/cell-phones/Philips_Xenium.shtml, pp. 1-3, Apr. 19, 2005.

http://steelskies.com/coverflow/ Jun. 2, 2008.

http://www.apple.com/otimes/jukebox/coverflow.html Jun. 2, 2008.

* cited by examiner

MOBILE COMMUNICATIONS TERMINAL AND METHOD THEREFORE

CROSS REFERENCE TO RELATED APPLICATION(S)

This application is related to U.S. patent application Ser. No. 11/140,549, filed on May 27, 2005 entitled "Improved Mobile Communications Terminal and Method Therefore", the status of which is pending.

FIELD OF THE INVENTION

The present invention relates to mobile telecommunication and more particularly to a mobile terminal with a digital objects browser, and an associated method and computer program product.

BACKGROUND OF THE INVENTION

A mobile (cellular) telephone for a telecommunications system like GSM, UMTS, D-AMPS or CDMA2000 is a common example of a mobile terminal according to the above. For many years, the conventional user interface of mobile telephones was limited to a display, a keypad, a speaker and a microphone. The mobile terminals of those times were predominantly used for speech communication (telephone calls), and therefore a simple, character-based user interface involving a small, monochrome display and a keypad sufficed. In recent times, mobile terminals have been provided with various features and services in addition to speech communication. Such features and services include, for instance, contacts/-phonebook, calendar, electronic messaging, video games, still image capture, video recording, audio (music) playback, etc. This expansion or broadening of the usability of mobile terminals has led to more sophisticated graphical user interfaces, typically involving a larger, high-resolution color display and a multi-way input device such as a joystick or a 4/5-way navigation key.

As the mobile terminals become more and more advanced, it is generally desired to present more and more information on the display. However, this is in conflict with strong market demands for miniaturized mobile terminals; a small overall apparatus size of the mobile terminals also restricts the size of the display. Therefore, available display area on the display screen of the display has been a limited resource and is expected to remain so also in the future.

Whenever several objects are to be presented simultaneously on the display screen, it is believed to be an advantage if such presentation can be made in a compact manner (allowing presentation of many objects at the same time) with as good as possible legibility of the individual objects.

This is particularly relevant when the digital objects are digital images. It is observed that many if not all new mobile terminals currently sold are equipped with an image browser and a digital camera. The user of such a mobile terminal typically stores and manages his captured images in a hierarchical file structure stored internally in the memory of the mobile terminal, or even in a more advanced image database. Some models of mobile terminals moreover allow the user to access, and even download, images provided at a remote server, etc, over the mobile telecommunications network or another data network associated therewith, such as the Internet. It is foreseen that such image browsing capability will continue to be an important factor for market success for mobile terminals in the future.

The image browser in current mobile terminals typically presents a compact representation of the available images, e.g. the images stored at a particular current level in the hierarchical file structure or image database, in an ordered manner on the display screen. The compact representation may typically be either the file names/image names of the images, or a thumbnail version of each image. As is well known in this technical field, a thumbnail version of an image is a small-sized, quality-reduced version of the original image. Often, a thumbnail is not completely legible, but it nevertheless gives the user a sense of the overall nature of the image—e.g. image hue, image style, etc. The ordered manner in which such thumbnails are presented on the display screen typically follows either a linear row or a grid structure. In the latter case, the thumbnails are shown in n rows, each row containing m thumbnails, therefore allowing simultaneous presentation of n×m thumbnails on the display screen. If the file names/image names are shown instead of the thumbnails, they are typically presented in a list on the display screen.

WO 2004/023283 discloses a graphical user interface system for a device such as an interactive television set-up box, a hand-held computer or a mobile terminal. A scrollable menu of selectable menu options are shown on the display screen in the form of a series of panels, or icons, along an essentially semi-circular path. Each panel or icon represents a respective selectable menu option. The user can scroll between different panels by pressing left and right arrow keys. In response to this, a cursor which focuses on a currently "highlighted" panel is shifted accordingly. When the cursor has been shifted a certain number of positions in one of the scrolling directions, the entire series of panels are shifted in the opposite direction, so that the focused panel is repositioned at a centered location at the bottom of the semi-circular path. A focused panel is selected, or, more precisely, the menu option represented by that panel is selected, by pressing a dedicated selection key such as Enter. In one embodiment, the menu is hierarchical, i.e. each panel on the uppermost (root) level represents a folder which in itself may contain subfolders and/or selectable panels on a lower level. The user moves between different levels in this hierarchical menu by way of up and down arrow keys. All panels (provided that they fit within the available display area) are shown for the current level in the menu system, and furthermore the parent panel (but only that) of a currently focused panel is shown.

An advantage of providing the digital objects, i.e. the selectable panels, along a curved path rather than in a one or two dimensional linear structure is that it allows a larger number of objects to fit withing the available area on the display screen. Moreover, it is believed to be a representation which is intuitive and user-friendly. However, WO 2004/023283 has a number of shortcomings.

Firstly, the solution proposed in WO 2004/02.3283 is not particularly suitable for a digital object browser, since apart from the limited-sized panels themselves, it does not provide any clear information about the particulars of each available digital object. In addition, the solution proposed in WO 2004/023283 lacks an expedient way of presenting, for convenient selection by the user, operations that are available for each digital object when it is focused.

Secondly, the present inventors have realized that the solution proposed in WO 2004/023283 does not make optimal use of the available display area.

Furthermore, the information provided as regards a focused object's whereabouts, relative to the hierarchical or otherwise ordered structure in which it is stored, is indicated only in a very limited way (immediately preceding level only, parent object only).

Similar, but simpler, graphical user interfaces with menu option icons along a curved path are disclosed in U.S. Pat. No. 6,411,307 and WO 02/39712.

SUMMARY OF THE INVENTION

In view of the above, an objective of the invention is to solve or at least reduce the problems discussed above. This is generally achieved by the attached independent patent claims.

A first aspect of the invention is a mobile terminal having a controller, a display and an input device connected to said controller, and a digital object browser for browsing among a plurality of available digital objects, a first representation and a second representation of each of said plurality of digital objects being presentable on a display screen of said display, said controller being adapted to cause said digital object browser to present said first representations of said plurality of digital objects along a predefined path on said display screen, the first representation of a focused one of said digital objects being shown in a focus area on said display screen;

present, for said focused one of said digital objects, the second representation thereof in a preview area on said display screen; and in response to a user input given on said input device, perform a desired scrolling operation among the first representations presented, thereby shifting the positions of the first representations on said display screen along said path accordingly, updating said focus area to reflect a change in focus from said focused one of said digital objects to another digital object by presenting in said focus area the first representation of said another digital object, as well as updating said preview area correspondingly by presenting therein the second representation of said another digital object.

To avoid any confusion, it is to be observed that whereas the first representations of said plurality of digital objects are shown simultaneously on the display screen, this is not the case for the second representations. Thus, a plurality of second representations are not shown simultaneously on the display screen. In fact, preferably only one is shown at a time, in the preview area, namely the one that represents the focused one of the digital objects.

Advantageously, the digital objects are images, the first representations are thumbnail versions of said images, and the second representation is a reduced version of the image whose thumbnail version is shown in said focus area. The reduced version may be larger, in at least one of image size, resolution or color depth, than the corresponding thumbnail version. This has the benefit of both allowing many thumbnails to be presented at the same time on the display screen (to give the user an overview of the images that are available), and simultaneously giving the user a legible preview of the focused image in the preview area.

To further optimize the use of the available display area on the display screen, the first representation of the focused digital object may be shown in a front view, whereas the first representations of digital objects other than the focused one may be shown as perspective views. Thus, when the digital objects are images, only the focused thumbnail is shown in front view, whereas all other thumbnails are shown in perspective views, which occupy less space on the display screen than a front view. Alternatively, use of the available display area may be optimized by showing the first representations of digital objects other than the focused one as front views, as with the focused digital object, however at smaller image size(s) than that of the focused digital object.

Use of the available display area on the display screen may be further optimized by letting the predefined path follow a non-linear (i.e., curved) geometrical curve, such as a circle or ellipse, or a segment thereof.

The digital objects are preferably arranged in a sequential order along the predefined path. Still more digital objects may be fitted onto the display screen at one and the same time by arranging the digital objects along two, three or even more predefined paths on the display screen. Such paths may or may not be interconnected to each other depending on implementation. If two paths are interconnected, an object which is scrolled beyond an end point of a first path may be scrolled onto a second path at a start point thereof, and vice versa.

There may be more digital objects available for browsing than the plurality for which the first representations are presented along the predefined path. In such a case, as one object is scrolled beyond one end point (or start point) of the predefined path, and its first representation consequently disappears from the display screen, the first representation of a hitherto not presented digital object may appear at an opposite start point (or end point) of the predefined path, in a scrolling manner which is familiar per se.

In one embodiment, the focus area on said display screen is fixed, i.e. it has a static position on said display screen. This is beneficial, since a more static display screen is less tiring and more intuitive to a user.

In this embodiment, the predefined path may advantageously be symmetrical around at least one symmetry axis, wherein said static position of said focus area on said display screen is located at an intersection of said path and said symmetry axis.

The input device may comprise a multi-way input device such as a 4/5-way navigation key or a joystick. Said controller may be adapted, upon receiving a first type of user input, such as a first-way actuation of the multi-way input device, to cause scrolling of said first representations in a first direction along said path, and said controller may be adapted, upon receiving a second type of user input, such as a second-way actuation of the multi-way input device, to cause scrolling of said first representations in a second direction along said path, said second direction being opposite to said first direction.

Upon receiving a third type of user input, such as a third-way actuation of aforesaid multi-way input device, the controller may be adapted to cause presentation on said display screen of a menu having a plurality of menu options representing different available operations on said focused one of said digital objects. As used herein, "operations on said focused one of said digital objects" may include any type of operation on digital objects which is normally available for controlling, processing, modifying, communicating or interacting with the digital objects in question. Thus, when the digital objects are images, this arrangement provides an expedient way of presenting, for convenient selection by the user, the operations which are available for each image when it is focused. Such operations on images may include, but is not limited to, open, delete, edit, send, rename, show details, etc.

The menu options of said menu are preferably selectable by said multi-way input device.

In one embodiment, the controller is adapted to cause said digital object browser to present information associated with said focused one of said digital objects in a description area on said display screen. Hence, this arrangement gives the user additional information about the particulars of each available digital object (apart from the visual appearance information provided by the thumbnail and preview of the image, when the digital objects are images). When the digital objects have a location in a hierarchical or otherwise ordered storage structure, the presented information associated with said focused one of said digital objects may advantageously include information about said focused object's location in the storage structure—e.g. hierarchical index number, file name including file system path, etc. Alternatively, the presented information may exclude such hierarchical storage information and simply consist in a name or index number representing the focused object.

The mobile terminal may be a mobile phone adapted for use in a mobile telecommunications network in compliance with a mobile telecommunications standard such as GSM, UMTS, D-AMPS or CDMA2000.

The mobile terminal may also or alternatively be a device selected from the group consisting of a digital notepad, a personal digital assistant and a hand-held computer.

At least some of the plurality of available digital objects may be stored in local memory in the mobile terminal. Additionally or alternatively, for a mobile terminal comprising a wireless communication interface to at least either a mobile telecommunications network or an external device, at least some of said plurality of available digital objects may be stored in said mobile telecommunications network or said external device and may be accessible to said controller and said digital object browser through said wireless communication interface. Thus, the user of the mobile terminal may use its digital object browser to browse among locally stored objects and/or remotely stored objects, depending on implementation.

A second aspect of the invention is a digital object browsing method for a mobile terminal having a display with a display screen, a first representation and a second representation of each of a plurality of available digital objects being presentable on said display screen, the method involving the steps of:

presenting said first representations of said plurality of digital objects along a predefined path on said display screen, the first representation of a focused one of said digital objects being shown in a focus area on said display screen;

presenting, for said focused one of said digital objects, the second representation thereof in a preview area on said display screen; and in response to a user input, performing a desired scrolling operation among the first representations presented, thereby shifting the positions of the first representations on said display screen along said path accordingly, updating said focus area to reflect a change in focus from said focused one of said digital objects to another digital object by presenting in said focus area the first representation of said another digital object, as well as updating said preview area correspondingly by presenting therein the second representation of said another digital object.

A third aspect of the invention is a computer program product directly loadable into a memory of a processor, the computer program product comprising program code for performing the method according to the second aspect.

The second and third aspects essentially have the same features and advantages as the first aspect.

A fourth aspect of the invention is a mobile terminal having a controller, a display and an input device connected to said controller, and a digital object browser for browsing among a plurality of available digital objects, said controller being adapted to cause said digital object browser to present a representation of each of said plurality of digital objects along a predefined path following a non-linear geometrical curve on said display screen, the representation of a focused one of said digital objects being shown in a focus area on said display screen; and in response to a user input given on said input device, perform a desired scrolling operation among the representations presented, thereby shifting the positions of the representations on said display screen along said path accordingly and changing focus from Said focused one of said digital objects to another digital object.

The digital objects may be images, and said representations may be thumbnail versions of said images.

The predefined path is advantageously endless, for instance in an elliptical form.

Advantageously, the representation of said focused digital object is shown at a given size on said display screen, whereas the representations of digital objects other than the focused one are shown at sizes which decrease with the distance along said path from said focused digital object.

The controller may be adapted, upon receiving a first type of user input from said input device, to cause scrolling of said representations in a first direction along said path, and be adapted, upon receiving a second type of user input from said input device, to cause scrolling of said representations in a second direction along said path, said second direction being opposite to said first direction.

Furthermore, the controller may be adapted, upon receiving a third type of user input from said input device, to perform an operation on said focused one of said digital objects. This operation may involve presenting a second representation of said focused one of said digital objects on said display screen, such a maximal-sized landscape presentation of a focused image on essentially the entire display screen.

Moreover, when said plurality of digital objects belongs to a given level in a hierarchical structure including at least one folder at said given level, a representation of said at least one folder may be included among said representations of said plurality of digital objects which are presented along said predefined path. If such a folder is focused, said operation may involve:

changing to a next level subordinate to said given level in said hierarchical structure; and causing presentation on said display screen of digital objects included in said folder instead of said plurality of digital objects belonging to said given level.

The controller may be adapted to cause said digital object browser to present information associated with said focused one of said digital objects in a description area on said display screen.

Moreover, the controller may adapted to adjust a shape or size of said predefined path depending on a number of said plurality of available digital objects.

The mobile terminal may be a mobile phone adapted for use in a mobile telecommunications network in compliance with a mobile telecommunications standard such as GSM, UMTS, D-AMPS or CDMA2000.

The mobile terminal may also or alternatively be a device selected from the group consisting of a digital notepad, a personal digital assistant and a hand-held computer.

A fifth aspect of the invention is a digital object browsing method for a mobile terminal having a display with a display screen, a representation of each of a plurality of available digital objects being presentable on said display screen, the method involving the steps of:

presenting said representations of said plurality of digital objects along a predefined path following a non-linear geometrical curve on said display screen, the representation of a focused one of said digital objects being shown in a focus area on said display screen; and in response to a user input, performing a desired scrolling operation among the representations presented, thereby shifting the positions of the representations on said display screen along said path accordingly and changing focus from said focused one of said digital objects to another digital object.

A sixth aspect of the invention is a computer program product directly loadable into a memory of a processor, the computer program product comprising program code for performing the method according to the fifth aspect.

The fifth and sixth aspects essentially have the same features and advantages as the fourth aspect.

Other objectives, features and advantages of the present invention will appear from the following detailed disclosure, from the attached dependent claims as well as from the drawings.

The controller may be a CPU ("Central Processing Unit"), DSP ("Digital Signal Processor") or any other electronic programmable logic device or combination of devices. The display may be any commercially available type of display screen suitable for use in mobile terminals, including but not limited to a color TFT LCD display.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF THE INVENTION

Figure 1:
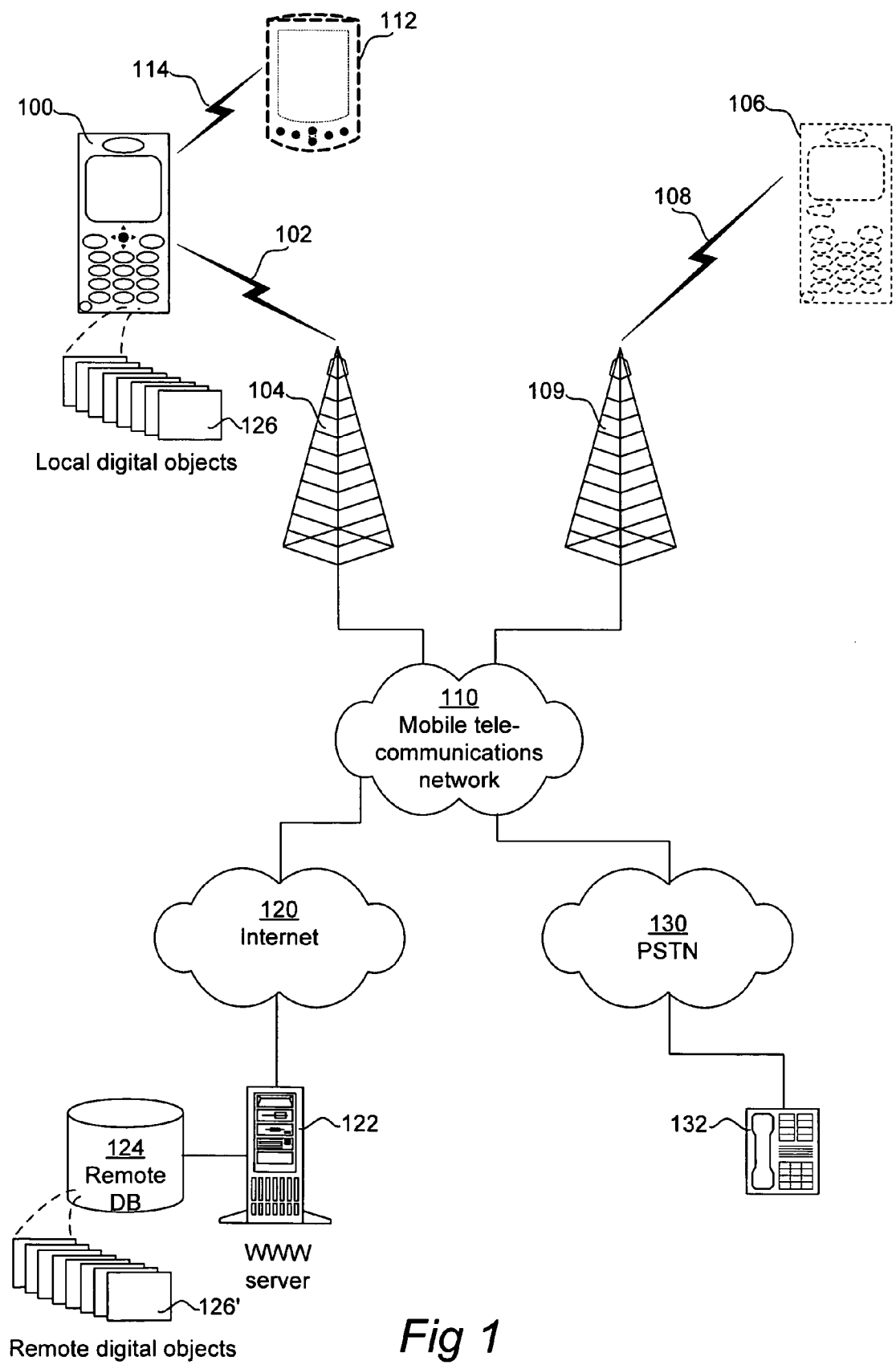
FIG. 1 is a schematic illustration of a telecommunication system, including a mobile terminal, a mobile telecommunications network and a couple of other devices, as an example of an environment in which the present invention may be applied.

FIG. 1 illustrates one example of a telecommunications system in which the invention may be applied. In the telecommunication system of FIG. 1, various telecommunications services such as voice calls, data calls, facsimile transmissions, music transmissions, still image transmissions, video transmissions, electronic message transmissions and electronic commerce may be performed between a mobile terminal 100 according to the present invention and other devices, such as another mobile terminal 106, a PDA 112, a WWW server 122 and a stationary telephone 132. It is to be noticed that for different embodiments of the mobile terminal 100, different ones of the telecommunications services referred to above may or may not be available; the invention is not limited to any particular set of services in this respect. More importantly in this context, the mobile terminal 100 according to the present invention is provided with a digital object browser, which may be used by a user of the mobile terminal 100 to browse among local digital objects 126, which are stored locally in or at the mobile terminal 100, and/or among remote digital objects 126', which are stored at a remote location, e.g. in a remote database 124 coupled to the WWW server 122.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS or CDMA2000.

The mobile telecommunications network 110 is operatively connected to a wide area network 120, which may be Internet or a part thereof. Various client computers and server computers, including WWW server 122, may be connected to the wide area network 120.

A public switched telephone network (PSTN) 130 is connected to the mobile telecommunications network 110 in a familiar manner. Various telephone terminals, including stationary telephone 132, are connected to the PSTN 130.

Figure 2:
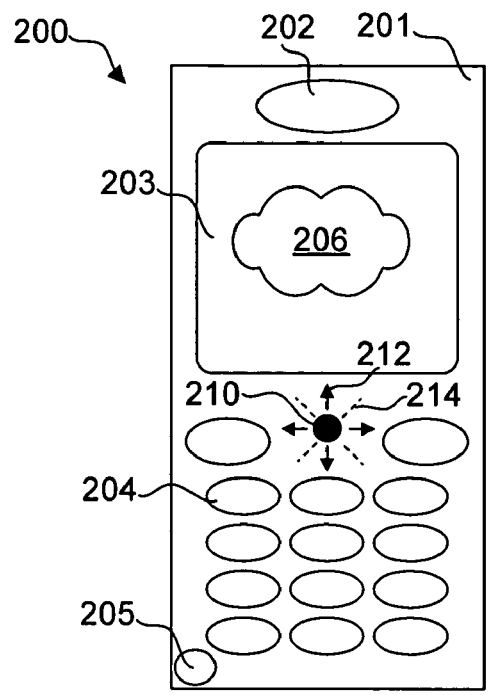
FIG. 2 is a schematic front view illustrating a mobile terminal according to a first embodiment, and in particular some external components that are part of a user interface towards a user of the mobile terminal.
Figure 4:
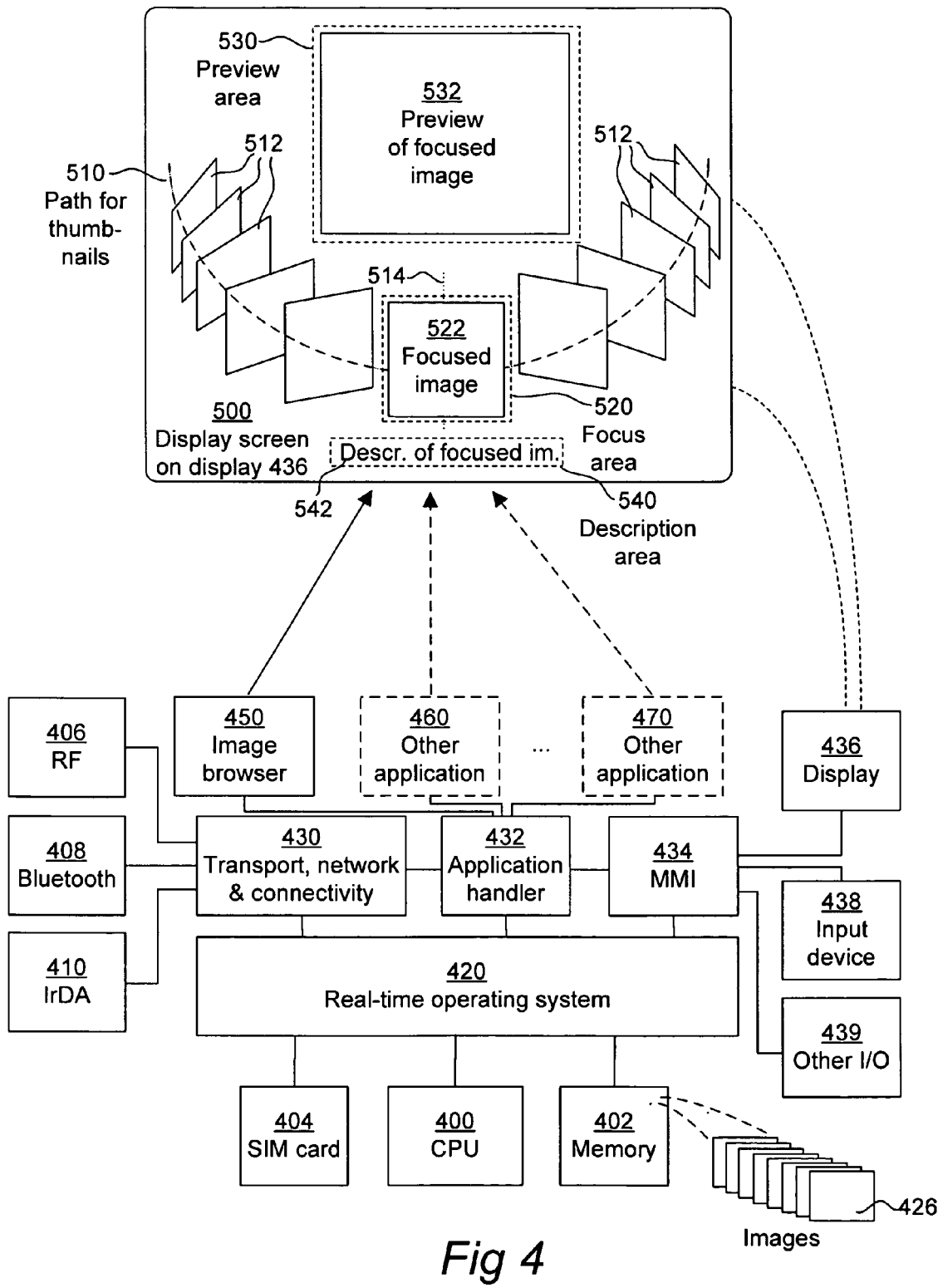
FIG. 4 is a schematic block diagram representing the internal component and software structure of a mobile terminal, which may be e.g. any of the embodiments shown in FIGS. 2 and 3.

A first embodiment 200 of the mobile terminal 100 is illustrated in more detail in FIG. 2. As is well known in the art, the mobile terminal 200 comprises an apparatus housing 201, a loudspeaker 202, a display 203, a set of keys 204 which may include a keypad of common ITU-T type (alpha-numerical keypad), and a microphone 205. In addition, but not shown in FIG. 2, the mobile terminal 200 comprises various internal components, the more important of which are illustrated in FIG. 4 and will be described later. External components 202-205 are all part of the user interface of the mobile terminal.

Furthermore, the user interface involves a multi-way input device 210 in the form of a joystick, the handle of which may be actuated by the user in a plurality of directions 212/214 so as to command navigating operations, i.e. to navigate in corresponding directions among information 206 shown on display 203, in a manner which is conventional per se for joystick-equipped mobile terminals. The navigation directions may be 4 in number, as indicated by solid arrows 212 in FIG. 2, and may be distributed orthogonally in an "up, down, left, right" or "north, south, west, east" fashion with respect to a base plane which is essentially coincidental or parallel with the display 203 or the front surface of apparatus housing 201. Alternatively, the navigation directions may be 8 in number, as indicated by dashed lines 214 together with solid arrows 212 in FIG. 2a, and may be distributed around a virtual circle in aforesaid base plane with successive 45° displacements, representing corresponding actuations of the joystick handle by the user.

The user may also perform a selecting operation among information 206 by actuating the joystick 210 in a direction perpendicular to the base plane, e.g. by depressing the joystick at its top. Depending on implementation, this will either cause displacement of the entire joystick handle, or will cause depression of a joystick select button. In some embodiments such a joystick select button may be located at the top of the joystick handle; in others it may be mounted next to the joystick handle on the base plane.

Figure 3:
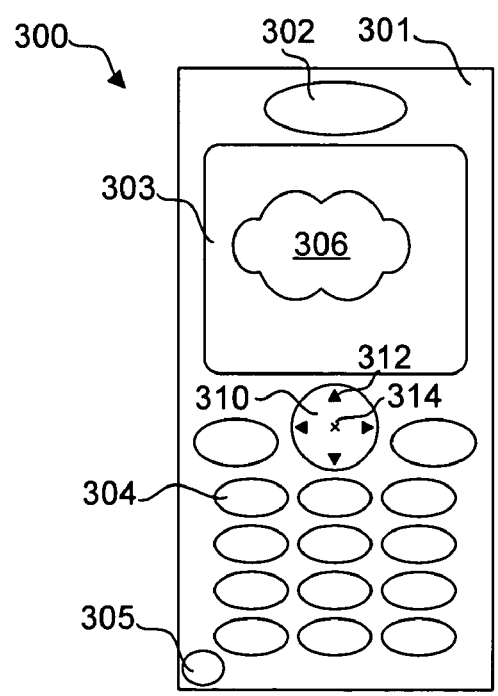
FIG. 3 is a schematic front view illustrating a mobile terminal according to a second embodiment.

Referring now to FIG. 3, a second embodiment 300 of the mobile terminal 100 is illustrated. In this embodiment, the multi-way input device is implemented as a 5-way navigation key 310 which is can be actuated (depressed) at different circumferential positions 312, that represent different navigation directions, so as to generate navigating operations in similarity with the description above for the embodiment of FIG. 2. Furthermore, a selecting operation may be commanded by depressing the 5-way key 310 at is center 314. The other components 301-305 are preferably identical with or equivalent to components 201-205 of FIG. 2.

The internal component and software structure of a mobile terminal according to one embodiment, which for instance may be any of the aforementioned embodiments, will now be described with reference to FIG. 4. In this embodiment, the digital object browser is an image browser 450 for digital images 426. The image browser 450 is implemented as a software application. The upper part of FIG. 4 illustrates a typical display layout for the image browser 450 when used for browsing images on the display screen 500 of the mobile terminal's display 436. The image browser 450, its display screen layout and the particulars of its functionality will be described in more detail later.

The mobile terminal has a controller 400 which is responsible for the overall operation of the mobile terminal and is preferably implemented by any commercially available CPU ("Central Processing Unit"), DSP ("Digital Signal Processor") or any other electronic programmable logic device. The controller 400 has associated electronic memory 402 such as RAM memory, ROM memory, EEPROM memory, flash memory, hard disk, or any combination thereof. The memory 402 is used for various purposes by the controller 400, one of them being for storing data and program instructions for various software in the mobile terminal. The data may include a plurality of images 426, which are accessible for browsing in the image browser 450, as will be described below. The software includes a real-time operating system 420, man-machine interface (MMI) drivers 434, an application handler 432 as well as various applications. The applications include aforesaid image browser 450 as well as various other applications 460-470, such as a contacts (phonebook) application, a messaging application, a calendar application, a control panel application, a camera application, a mediaplayer, one or more video games, a notepad application, etc.

The MMI drivers 434 cooperate with the display 436 (which may be identical to the display 203 of FIG. 2 or the display 303 of FIG. 3), a joystick 438 (which may be identical to the joystick 210 of FIG. 2) as well as various other I/O devices such as a microphone, a speaker, a vibrator, a keypad (e.g. the set of keys 204 of FIG. 2), a ringtone generator, an LED indicator, volume controls, etc. As is commonly known, a user may operate the mobile terminal through the man-machine interface thus formed, which in the disclosed embodiment is of the very common kind known as GUI (graphical user interface).

The software also includes various modules, protocol stacks, drivers, etc., which are commonly designated as 430 and which provide communication services (such as transport, network and connectivity) for an RF interface 406, and optionally a Bluetooth interface 408 and/or an IrDA interface 410. The RF interface 406 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analog and digital electronic components, together forming a radio receiver and transmitter. These components include, i.a., band pass filters, amplifiers, mixers, local oscillators, low pass filters, AD/DA converters, etc. The mobile terminal may be provided with other wireless interfaces than the ones mentioned above, including but not limited to WLAN and HomeRF. Any one of such other wireless interfaces, or aforementioned optional interfaces 408 and 410, may be used for establishing and communicating over the wireless link 114 to the nearby device 112 of FIG. 1.

The mobile terminal also has a SIM card 404 and an associated reader. As is commonly known, the SIM card 404 comprises a processor as well as local work and data memory.

Referring again to the upper part of FIG. 4, the image browser 450 will be described in more detail. As previously explained, a user of the mobile terminal may use the image browser to browse among a plurality of available digital images, either stored locally in memory 402 or externally at a remote location (cf remote digital objects 126' of FIG. 1). For reasons of clarity and simplicity, the rest of this description will refer only to the locally stored images, referred to as 126 in FIG. 1 and 426 in FIG. 4, in a non-limiting way.

The images 426 may have several different origins; they may for instance have been captured as still photographs in a camera application, or have been created in an image editor or paint tool application, or have been downloaded into memory 402 from a remote location over any available communication interface in the mobile terminal (RF interface 406, etc). Combinations of these origins are of course possible, so that some of the available images 426 are locally captured photographs, whereas others are created in an image editor, etc. The images are conveniently stored as files in a hierarchical file system, which is managed by the real-time operating system 420 and which may include also other types of objects. Alternatively, the images 426 may be stored in a database managed by the image browser 450. Still one alternative would be to store the images 426 as a simple non-hierarchical sequence of objects in memory 402.

As to the file format, image size, color depth, etc, of the images 402, these may generally be selected from any existing image standard, compressed or non-compressed, including but not limited to JPEG, GIF, TIFF or plain bit map.

The user may enter the image browser in any available way, for instance by selecting a menu option, etc, in the user interface formed by operating system 420 and MMI drivers 434. Moreover, in case the images 426 are stored in a certain folder in a hierarchical file system, the image browser will allow the user to select the desired current folder in any of several different ways which are well known per se. For instance, the user may press a dedicated key (such as a menu key or option key) on the keypad 204, 304 to invoke a list of available operations, including one option for selecting the current folder. For the rest of this description it is assumed that the user has selected the desired current folder in any available way.

As seen in FIG. 4, the display screen 500 of the display 436 is used by the image browser 450 in the following way. A plurality of available images is selected among the images 426 in memory 402. For each of these plurality of images, a first representation in the form of a thumbnail image 512 is presented along a curved path 510. In the disclosed embodiment, the path 510—which is visibly illustrated in dashed style in FIG. 4 but which preferably is invisible in an actual implementation—essentially has the shape of a semi-ellipse. However, various other geometrical shapes are possible for the path 510. Advantageously, any such shape is symmetrical around a symmetry axis 514 which may be coincident with a vertical center axis of the display screen 500. Since the thumbnails 512 are arranged along a curved path rather than a (recti-)linear, more thumbnails may be shown simultaneously on the display screen 500 than if the path would have been straight. Use of the available display area on the display screen 500 is optimized further in the disclosed embodiment by showing all thumbnails 512 in perspective views rather than ordinary front views, except for a currently focused image 522 which is shown in front view at a focus area 520. The focus area 520 is fixed, i.e. has a static position on the display screen, at an intersection of the thumbnail path 510' and its symmetry axis 514.

In some implementations, the thumbnails 512 may have been produced on beforehand and stored in, memory 402, in association with the respective full-scale images 426. Even the perspective effect of the thumbnails may be pre-processed in this manner. Thus, in such implementations, the image browser 450 only has to read the pre-processed thumbnails 512 from memory 402 and arrange them along the curved path 510 for presentation.

In the disclosed embodiment, though, the thumbnails, and their perspective effects, are not pre-stored, one reason being to save valuable storage space in memory 402. A second reason is that the perspective is different between individual thumbnails, as appears from FIG. 4. As seen in FIG. 4, the perspective effect is strongest for thumbnails remote from the centered focused image 522, and grows less and less strong the closer the particular thumbnail gets to the focused image. Therefore, producing also the perspective effect on beforehand makes little sense in this case, since the perspective effects will anyway have to be recalculated each time the sequence of thumbnails 512 is scrolled in either direction.

Such varying perspective between different thumbnails is an advantageous feature. This allows even more thumbnails to be shown on the display screen 500 at the same time, without jeopardizing the legibility to any considerable extent, since the more centered thumbnails are shown at a low perspective angle, or even none (as is the case with the focused image 522 in the disclosed embodiment). It is to be noticed that the focused image itself is also a thumbnail image representing its associated full-scale image in memory 402.

Thus, in the disclosed embodiment, each image 426 that is to be represented on the display screen 500 is read from memory 402 by the image browser 450. The thus read image is processed by appropriate image processing algorithms included in or available to the application software that defines the image browser 450, so as to produce a corresponding, small-sized, low-quality thumbnail in perspective view, which is then immediately presented along the curved path 510. Whether or not thumbnails are to be pre-produced or produced "on the fly" is a trade-off which will have to be considered for each implementation.

Specifically for the focused image 522, in a preview area 530 a preview 532 is shown for the full-scale image 426 which is currently focused and the thumbnail 522 of which is shown in the focus area 520. The preview 532 is a reduced version of this focused full-scale image 426. The reduced version is larger in image size, and preferably also resolution and/or color depth, than the corresponding thumbnail version 522, thus giving the user a legible preview 532 of the focused image 522 in the preview area 530.

As is the case with the thumbnails, the previews of all available images 426 may be produced on beforehand and stored in memory 402, or may be processed on the fly by the image browser 450 when the particular image becomes focused and its thumbnail 522 appears in the focus area 520. When another thumbnail 512 is scrolled into the focus area 520, the preview of the formerly focused image is replaced with a preview of the new focused image. Thus, the focus area 520 functions like a static-positioned cursor that indicates which one of the thumbnails 512 that is currently focused and previewed in the preview area 530.

In the disclosed embodiment, a description 542 of the focused image 522 is provided for the benefit of the user in a description area 540 on the display screen 500. As seen in FIG. 4, the description area 540 is advantageously located in the lowermost region of the display screen 500, in vertical alignment with the focus area 520 and preview area 530 around the symmetry axis 514. The description 542 serves to provide a different kind of information about the focused object than the strictly visual (i.e., image-like) information provided by the focused image's thumbnail 522 and preview 532. The description 542 is advantageously an index number and/or a filename of the focused image, with or without information that relates to the focused image's location in the hierarchical or otherwise ordered storage structure in memory 402, e.g. a file system path. For instance, an index number may simply be "13", indicating that the focused image 522 is number 13 among the available images in the currently selected folder in a local file system in memory 402, whereas a file name with file system path may look like "MyPhone:\Images\Summer_2004\P00113.jpg".

Figure 5A:
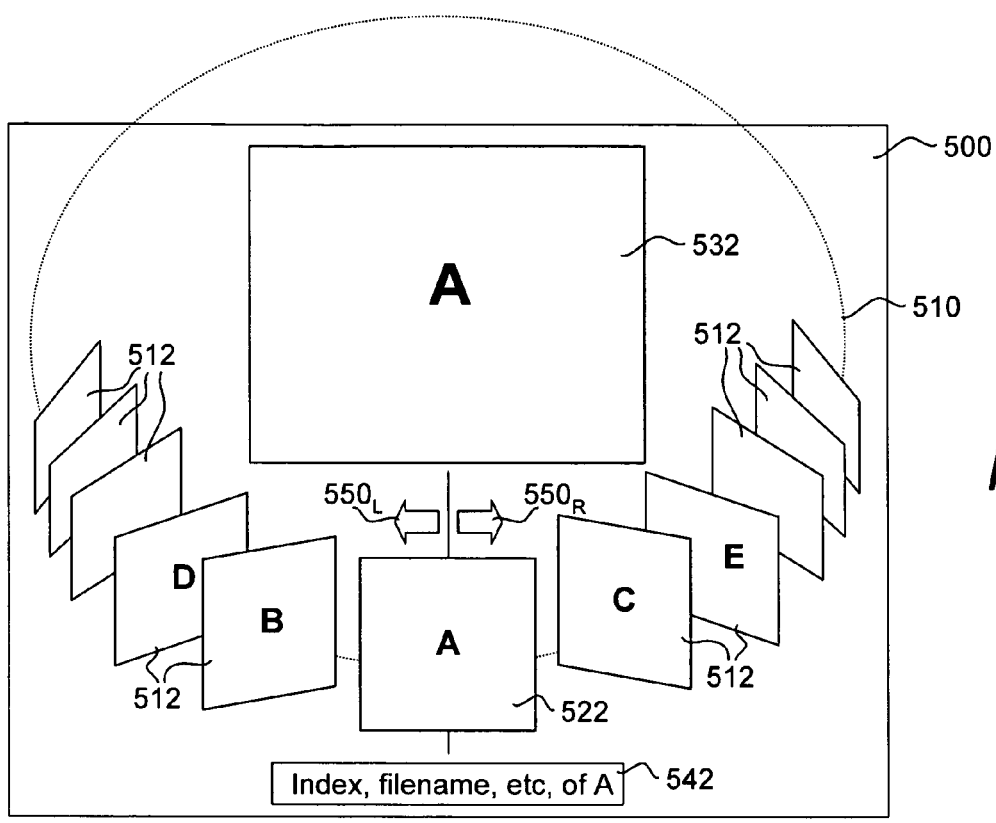
FIGS. 5a-5e are schematic display screen illustrations of the digital object browser according to one embodiment of the present invention.
Figure 5B:
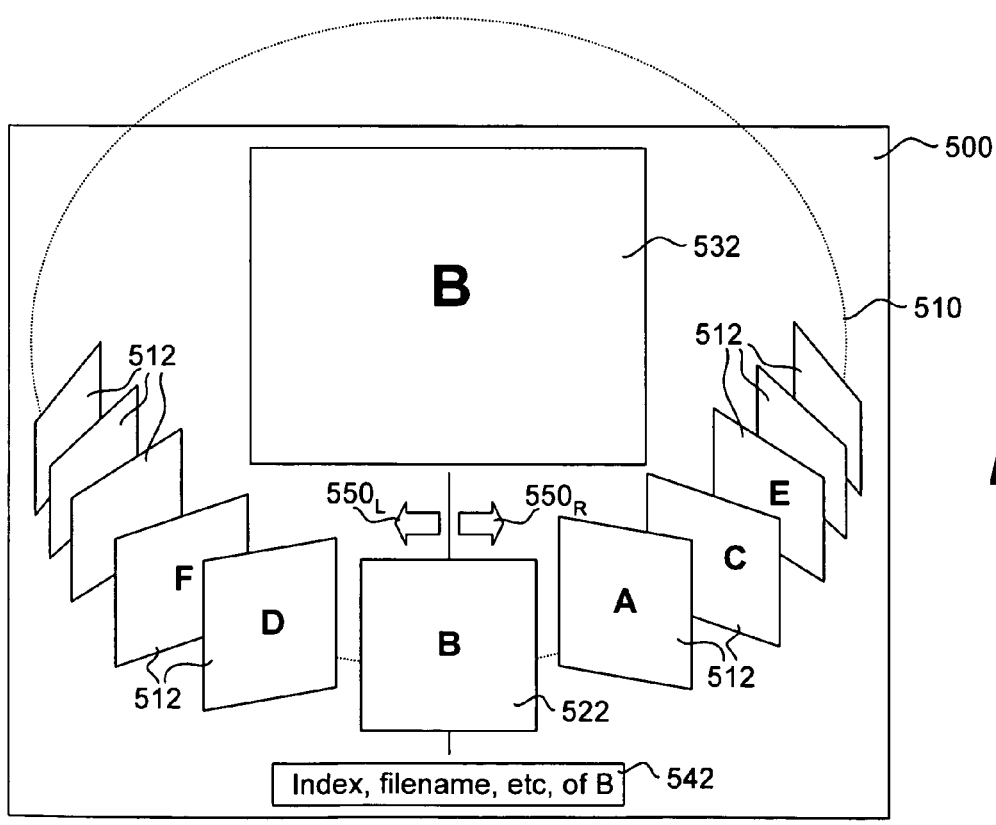

FIGS. 5a and 5b illustrate how the contents of the display screen 500 change when the user commands scrolling of the thumbnails 512 by one (1) step to the right. As may be realized from FIGS. 5a and 5b, a perspective angle of each of the thumbnails increases depending on a distance along the path from the focus area such that an angle between intersecting planes of one of the digital objects and the focused one of the digital objects increases depending on the distance along the path from the focus area. As may also be realized from FIGS. 5a and 5b an overlap of each of the digital objects progressively increases depending on the distance along the path from the focus area. In FIG. 5a, arrows 550$_L$ and 550$_R$ indicate the possible scrolling directions, i.e. to the left and to the right, for the user. In FIG. 5a, the currently focused image is denoted A, and its nearest neighbors along the thumbnail path 510 are denoted B and D (to the left of the focused image 522), and C and E (to the right of the focused image 522). As explained above, the preview of A is shown at 532, and the description thereof is shown at 542. Now, by giving a certain user input on the input device 438, the user may command scrolling. For instance, such user input may be given by actuating the joystick 210 (FIG. 2) or 5-way key 310 (FIG. 3) in its left or right navigation direction.

Assuming that the user gives a user input to command scrolling to the right, the image browser 450 will receive this user input and promptly act to update the display screen so that it will have the contents shown in FIG. 5b. As is seen in FIG. 5b, all thumbnails 512 are moved one position to the right (anti-clockwise rotation) along the thumbnail path 510. The formerly focused thumbnail A is shifted out of focus into the position that was formerly held by thumbnail C. At the right side of the focus area 520, thumbnail C moves one step to the position formerly held by thumbnail E, etc. i.e. all thumbnails at this side are shifted one step away from the focus area. At the left side, on the other hand, all thumbnails are shifted one step closer to the focus area, and thumbnail A's nearest left-hand neighbor B is shifted into the focus area 520 and becomes the focused image 522.

Moreover, the preview of A is replaced by the preview of B at 532, and the description of A is replaced by the description of B at 542. If not all available images 426 in the current folder, etc., were represented by thumbnails 512 in FIG. 5a, the farthest thumbnail on the right side of the focus area 520 disappears as the thumbnails are scrolled into the state shown in FIG. 5b, whereas a new thumbnail for a formerly not represented image 426 will be provided and shown at the farthest position along the thumbnail path 510 on the left side of the focus area 520 in FIG. 5b.

Of course, if the user instead gives a user input in FIG. 5a to perform a one-step scrolling to the left, all updates on the display screen will reflect this, so that the thumbnails are shifted one step to the left (clockwise) along the path 512, etc.

Figure 5C:
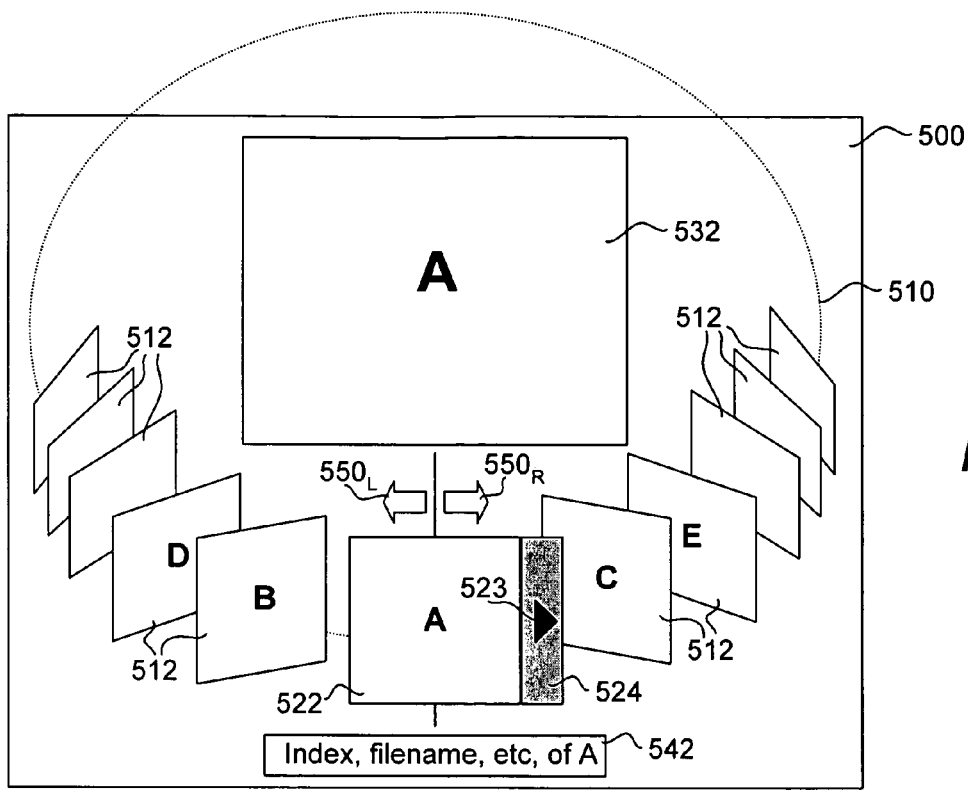
Figure 5D:
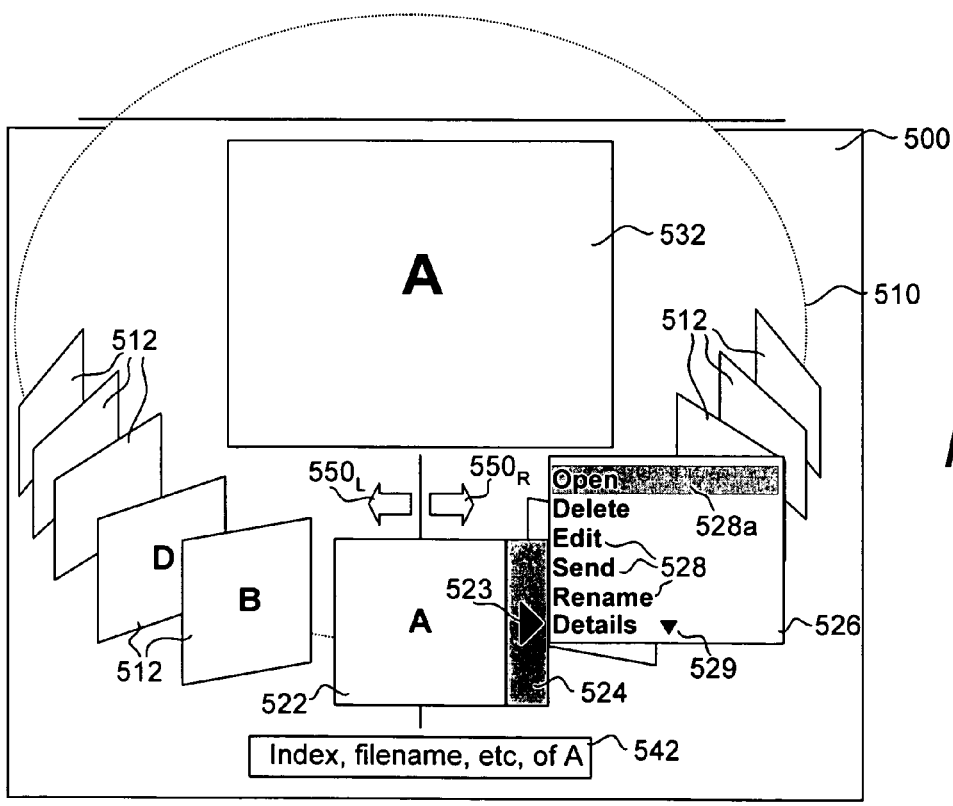

FIGS. 5c and 5d illustrate another advantageous feature of the disclosed embodiment, namely providing convenient access for the user to a pop-up menu of operations that are available for the focused image 522. As seen in FIG. 5c, a pop-up menu bar 524 is displayed to the very right of the focused image 522. The pop-up menu bar 524 may be shown automatically as soon as the focused image 522 appears in the focus area 520, or alternatively a user action is required (such as a select action on the joystick 210 of FIG. 2, or by depressing the 5-way navigation key 310 of FIG. 3 at its center 314) to cause presentation of the pop-up menu bar 524 on the display screen 500. The first alternative has an advantage in that it does not steal attention from the focused image 522, and nor does it partly hide the nearest right-hand neighbor thumbnail (C in FIG. 5c), before the user actively chooses to bring about the pop-up menu bar 524. On the other hand, the second alternative has an advantage in that it is more intuitive and convenient, at least to an inexperienced user, since it shows the pop-up menu bar 524 automatically, thereby clearly indicating the availability of various operations on the focused image 522.

A small left-arrow 523 in the pop-up menu bar 524 indicates that the user has to perform a navigate-left action on the input device 428 (tilting the joystick handle to the left or depressing the 5-way key to the left at its rim portion, etc). Following this, a list of available menu items 528 will be shown in a pop-up menu 526 immediately to the right of the pop-up menu bar 524, as seen in FIG. 5d. When the pop-up menu 526 is brought forward, its top menu item 528a is highlighted. The user may scroll in the pop-up menu 526 by way of the input device 438, e.g. by navigate-up and navigate-down actions on joystick 210 or 5-way navigation key 310, thereby causing another menu item 528 to become highlighted. Further menu items, currently not displayed in the pop-up menu 526, may be indicated by a downward-pointing arrow 529 and made available by performing a navigate-down action on the input device 438 when the lowermost menu item is highlighted, thereby causing downwards scrolling of the list of menu items 528. By performing a selecting action (for instance any of the ones described in the preceding paragraph) on the input device 438, the user may select the highlighted menu item, wherein the associated operation will be performed by the image browser 450 in cooperation with the application handler 432 and operating system 420.

For instance, in the disclosed embodiment, if the selected menu item 528 is Open (528a in FIG. 5d), the image browser 450 will present a enlarged version of the focused image 522 on essentially the entire display screen 500, or a majority thereof. This larger version of the focused image is considerably larger in image size, and optionally resolution and/or color depth, than the preview 532.

If the selected menu item 528 is Edit, the image browser 450 will place a function call to an image editor application (included among applications 460-470 in FIG. 4), wherein the application handler will invoke this image editor and instruct it to activate itself with the particular image among images 426 that is represented by the focused thumbnail 522 in FIG. 5d.

Selecting the menu item Send may correspondingly invoke a messaging application and prepare for transmittal of the image in question as an attachment in an electronic message such as email or MMS.

The menu item Details will provide further information on the focused image, e.g. detailed file name including file system path, size, image type, creation or edit date and time, etc.

The meaning of the remaining menu items is believed to be self-explanatory and needs no further description herein. Of course, the menu items 528 illustrated in FIG. 5d are only exemplifying. Furthermore, the pop-up menu 526 may be hierarchical, i.e. so that any one of the first-level menu items 528 may lead to a second-level pop-up menu of menu items when the user performs a navigate-right action on the input device 438.

Figure 5E:
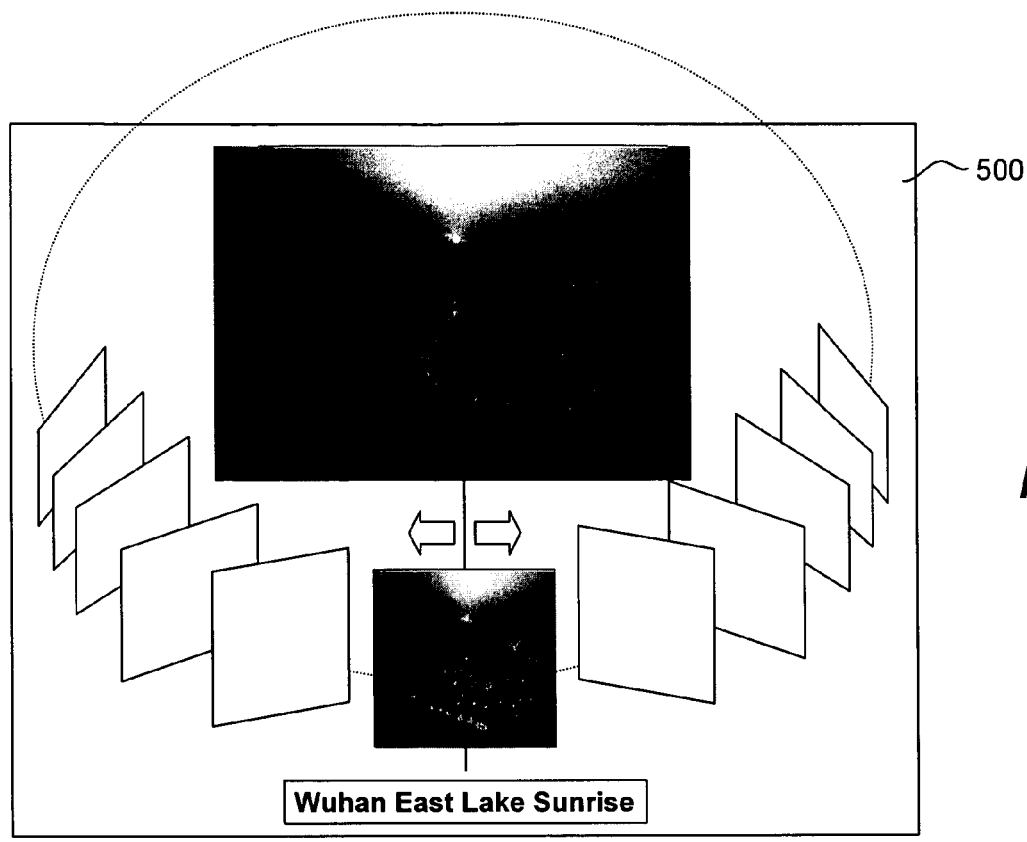

FIG. 5e serves to give a less schematic illustration of how the display screen 500 may look like in an actual implementation.

Figure 5F:
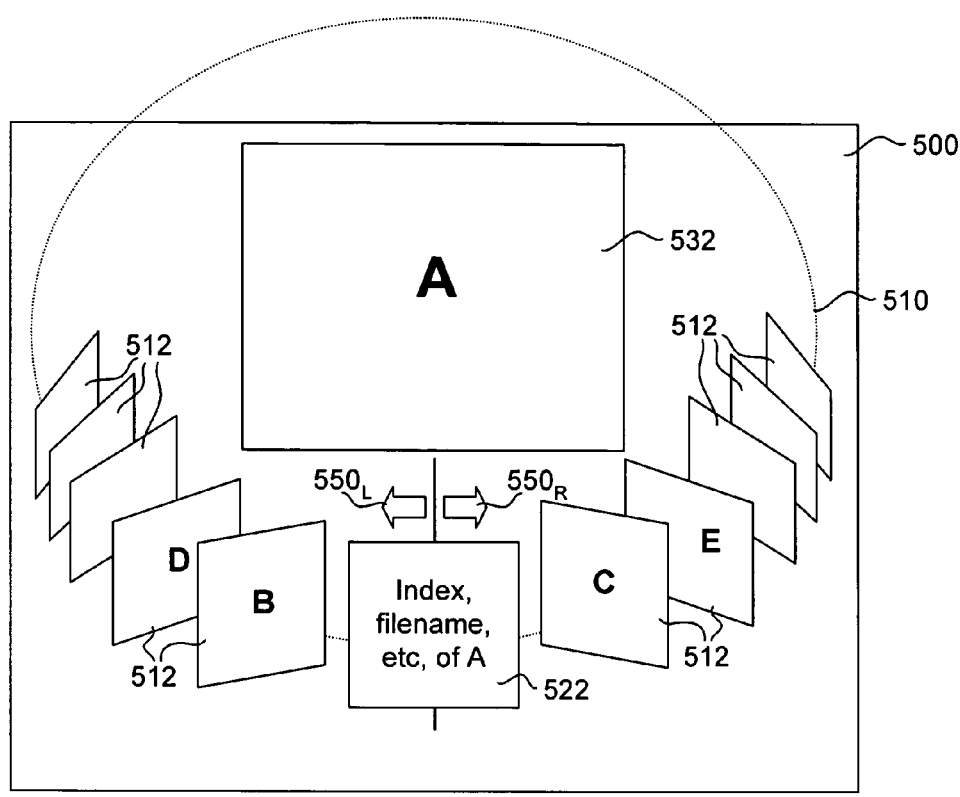
FIGS. 5f-5g are schematic display screen illustrations of a digital object browser according to an alternative embodiment of the present invention.
Figure 5G:
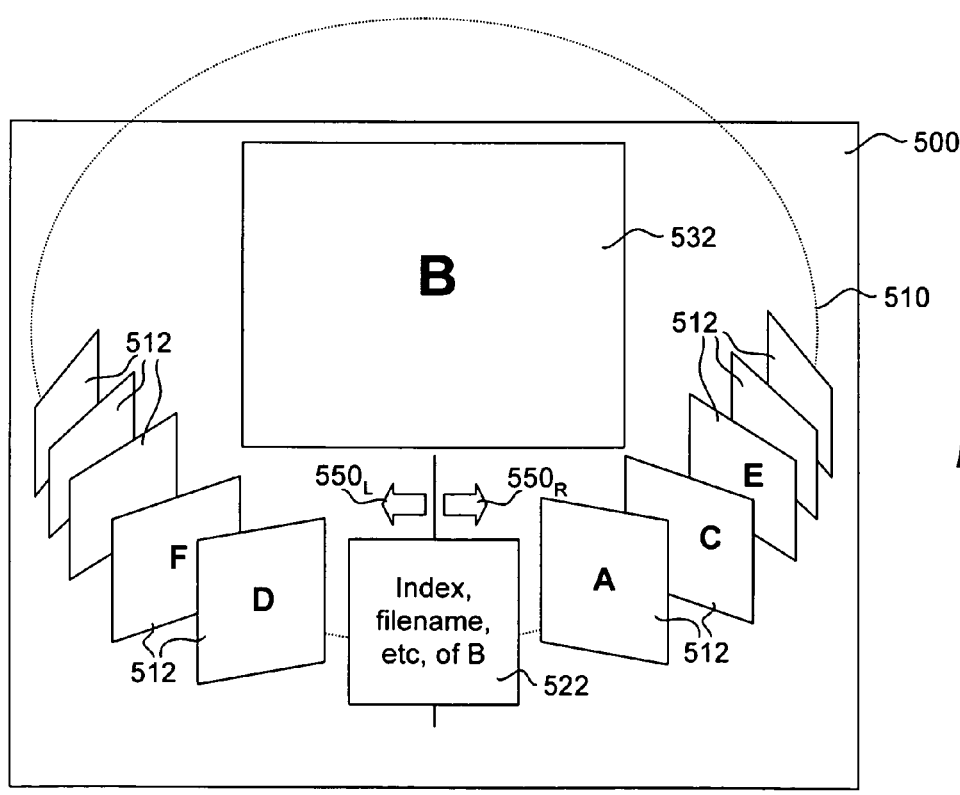

FIGS. 5f and 5g illustrate another embodiment of the invention and, in more particular, how the contents of the display screen 500 change when the user commands scrolling of the thumbnails 512 by one (1) step to the right. This embodiment is similar to the one described above for FIGS. 4 and 5a-5e, expect for the following difference. As seen in FIG. 5f, for the currently focused image A, there is no presentation of its thumbnail at 522. Instead, at 522, a description of the focused image A is given (corresponding to the description which for the previous embodiment was shown in the description area 542, e.g. an index, filename, etc, of the currently focused image). This alternative embodiment has an advantage in that display space is saved, thanks to the elimination of a separate description area for presentation of a description of the currently focused image.

Figure 6A:
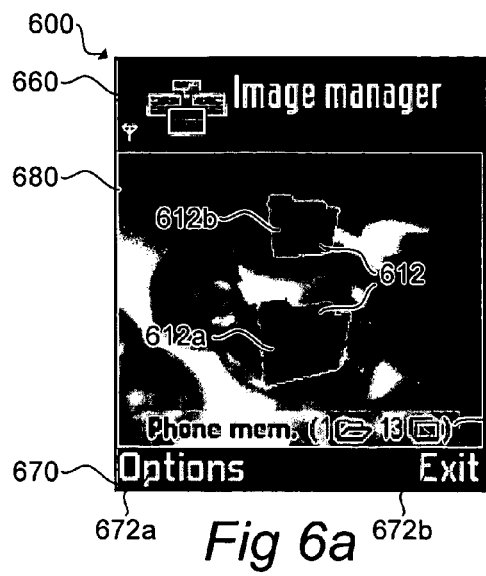
FIGS. 6a-6e are schematic display screen illustrations of a digital object browser according to still an alternative embodiment of the present invention.

FIGS. 6a-6e illustrate still another embodiment of an image browser according to the invention, and more particularly a sequence of display screen snapshots from the image browser. The image browser of this embodiment is particularly advantageous for browsing of images that are stored or otherwise provided in a hierarchical structure, such as a file system or a digital photo album. Thus, in this embodiment, available elements 612 in the form of images and folders are displayed in a 3D ring-shaped structure which may be conveniently browsed. As seen at 612a-b and 618, folders are displayed as 3d graphical icons, whereas images are shown as front-view thumbnails (612, 616) with a size which depends on their respective distance to the currently focused image 622 (the latter being shown with the largest size at the "foremost" position on the display screen). FIG. 6a illustrates a main view for the image browser, used as an entry into the actual display view of the image browser (the display view being illustrated further in FIGS. 6b-6d). In the main view of FIG. 6a, the display screen 600 is divided into an upper status panel 660, a main display area 680 and a lower soft key panel 670. In a manner well known per se, the status panel 660 may present various operational status indicators as well as a name or title of the currently active application (e.g. "Image manager" in FIG. 6a) or the current folder (e.g. "Holiday" in FIG. 6c). Moreover, the soft key panel 670 may present explanatory labels for the current meaning or function of certain soft keys of the mobile terminal (e.g. an "Options" function 672a assigned to a left soft key, and an "Exit" function 672b assigned to a right soft key, as seen in FIG. 6a).

The main display area 680 presents graphical folder icons 612 representing the different available data storages in the mobile terminal. In FIG. 6*a*, the foremost (focused) icon 612*a* represents the internal memory ("phone memory") of the mobile terminal, whereas icon 612*b* represents an accessible memory card. At 642, a description of the focused icon 612*a* is given, including its name and the number of folders and images available at its root level. By navigating among these icons 612*a-b* and selecting the desired one (by depressing a certain key, such as a Selection key), in analogy with the previously described embodiments, the user may open e.g. the "phone memory" 612*a*. Upon this selection, the view will change into the display view, as is illustrated in FIG. 6*b*.

The display view also uses a division of the display screen 600 into an upper status panel 660, a main display area 680 and a lower soft key panel 670. In FIG. 6*b*, the main display area 680 shows folder icons 618 and thumbnail images 616 for the available elements 612 at the root level of the "phone memory". In more particular, these folder icons and thumbnails are arranged along a ring-shaped path 610 and are shown in a 3D fashion, such that the focused thumbnail/folder icon 622 is shown up front in a relatively large size, whereas remote thumbnails/folder icons are shown at successively smaller sizes. Thumbnails 612 may be presented in the order of date/time, newest first, such that the newest thumbnail is the nearest element (at 622). Folders may be shown after thumbnails in alphabetical order. The ring-shaped path 610 is a looping list, so that the last folder is on the left side of the newest thumbnail. This enables fast access to folders.

Figure 6B:
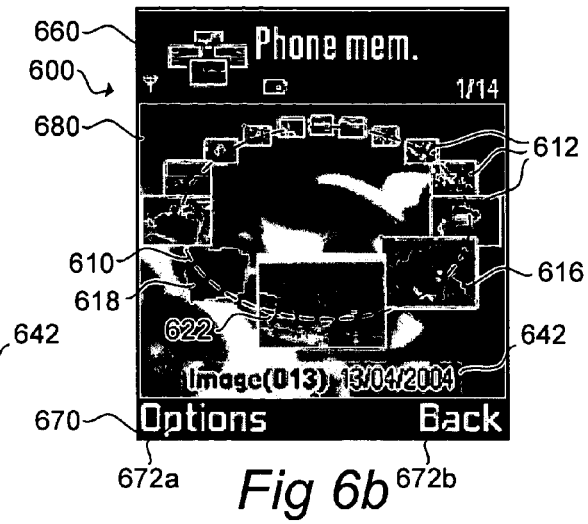
Figure 6C:
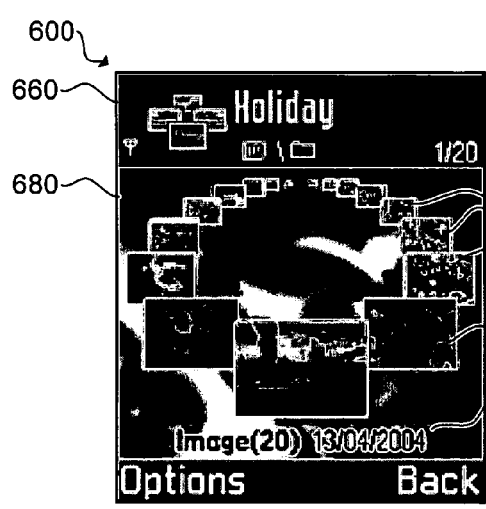

As seen in FIG. 6*b*, the "phone memory" folder contains 13 images 616 and 1 sub folder 618. By navigating among these elements, the user may focus on different ones at his desire. If the sub folder 618 is in focus, at 622, it may be selected and opened into a new folder view of its contents, as shown in FIG. 6*c* ("Holiday" being the name of the sub folder 618 in FIG. 6*c*).

The shape of the ring-shaped path 610 may change with the number of elements in the current folder. The emphasis is on showing the elements at the front with good quality and at the same time being able to show an overview of as many elements as possible, preferably about 20 or so. At least the five nearest thumbnails should be almost completely legible. Therefore, advantageously, the focused thumbnail 622 is shown at a size of 64×48 pixels.

If the number of elements is greater than can be shown at reasonable quality on the display screen simultaneously, the elements furthest in the back will disappear. When the ring is rotated (i.e., scrolled by the user actuating e.g. arrow keys, a joystick or a navigation key), one element will disappear from one end and another one will appear at the other end. The order of the elements 612 will remains the same.

If the focused element 622 is a thumbnail, the description 642 contains the name and creation/last save date of the image it represents.

Figure 6D:
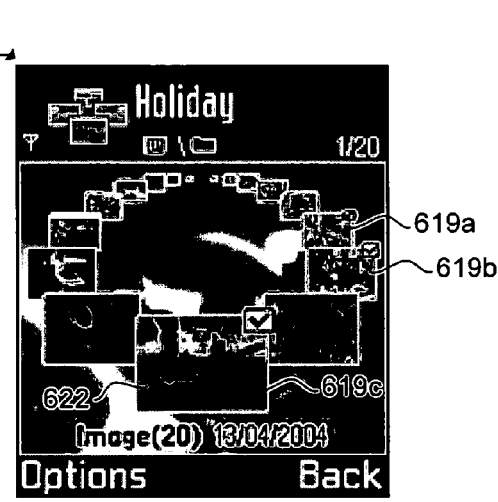

The user may mark a focused thumbnail 622 by depressing a certain key, such as an Edit key. Then, by scrolling the thumbnails 612 to focus on other thumbnails, the user may mark further thumbnails. In FIG. 6*d*, three thumbnails 619*a-c* have been marked and are indicated by small check marks at their uppermost right corner.

Selection of the right soft key 672*b* will return the image browser to the previous view. For instance, selecting the right soft key 672*b* in FIG. 6*b* will cause a return to the main view of FIG. 6*a*. Here, pressing soft key 672*b* again will exit the image browser. Depression of a certain key, such as a Clear key, will delete the focused thumbnail (or rather the image it represents), or a plurality of marked thumbnails, as the case may be. Selection of the left soft key 672*a* will present a list of available options for the focused element 622.

The list of available options may include operations such as:

Open. Will open a focused thumbnail into an image view (FIG. 6*e*), in which the corresponding image will be shown in full view 690, or a focused folder into the above-described folder view.

Image show. Shows all images in an image slide show using aforesaid image view. In case there are thumbnails marked, only the images corresponding to marked thumbnails are shown.

Send. This operation is available when the focused element 622 is a thumbnail. It is also available when there are one or more marked thumbnails. A sub-menu with the following options will be presented:

Via multimedia (e.g. MMS).

Via e-mail (when a remote mailbox has been defined).

Via Bluetooth.

Delete. May be used for deleting a focused thumbnail or one or more marked thumbnails. Further, a focused folder may be deleted, including its contents. For improved security, certain folders (such as default folders or folders not created by the user) may be excluded from deletion. Moreover, additional confirmation may be requested from the user when attempting to delete a folder.

Move to folder. Allows moving focused or marked image(s) or user-created folder(s) into any visible folder inside the Image manager application (image browser).

Copy to. Allows copying of focused or marked image(s) or user-created folder(s) to any visible folder inside the Image manager application.

New folder. Creates a new folder.

Mark/Unmark. When selected, opens a sub-menu containing different mark/unmark options:

Mark or Unmark

Mark all

Unmark all

Rename. Available when no thumbnail or folder is marked.

View details. Opens a detailed view for a focused image.

Help. Opens a help window.

Exit. Exits the Image manager application.

The shown options are determined on the basis of folder contents. Only relevant functions are available.

When one or more thumbnails are marked, actuating the Selection key will open a context-specific options list. This list contains only functions that can be used for marked thumbnails.

Image show. Shows the images corresponding to the marked thumbnails as an image slide show.

Send. Same as above.

Delete. Same as above.

Mark/Unmark. Same as above.

Figure 6E:
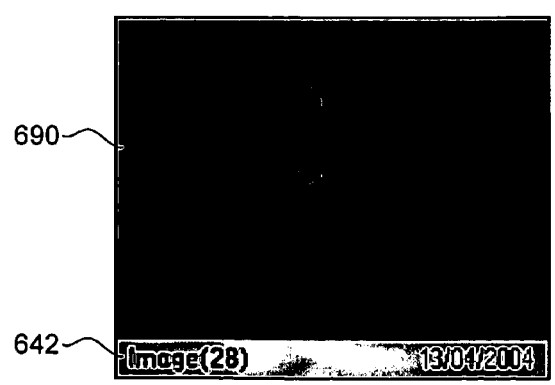

The image view is illustrated in FIG. 6*e*. In this view, images are displayed utilizing the screen as much as possible. For a display screen like 600 in FIGS. 6*a*-6*e*, which is larger in height than in width, the image view will rotate the presented image by 90 degrees to achieve a convenient landscape presentation which suits most images. Such a landscape presentation may involve showing the image in e.g. the size 208×156. The user may then turn the mobile terminal correspondingly to get an optimal presentation of the image in question.

If a number of thumbnails 619*a-c* have been marked as in FIG. 6*d*, all marked images may be shown in successive order. Switching from a currently shown image to a next one in order may either occur automatically within a predetermined time period, or in response to the user depressing a certain key.

If no thumbnails have been marked, the image view may either present all available images in the current folder in a slide show, or present just the image for the focused thumbnail 622.

The embodiment described above with reference to FIGS. 6a-6e may be expanded into a general concept for browsing of digital objects arranged in a hierarchical structure, such as a file system or a digital photo album. Groups of objects (folders and digital objects, e.g. images) are organized around a spindle, which in itself may or may not be indicated on the display screen. The objects of the current folder will form a ring around the spindle. Within the current folder the user can change the object in focus by using sideways navigation, and when selecting the object it will open to the screen. The user may move between different folders by using upward or downward navigation. Thus, the contents of a selected folder will open up and be displayed in a ring around the spindle.

In a further development of this concept, also the spindle itself is a ring, thus forming a hierarchical system. The main level may be composed of a horizontal ring. The horizontal ring is surrounded by smaller vertical rings, which are attached to the horizontal one. These sub-rings may contain images and/or folders. Sideways navigation is used when moving in between vertical rings. When using up and down navigation keys, different items can be rotated. If a deeper structure is needed, more levels can be added to the vertical rings. Such new levels may have a horizontal position. Tilting or zooming functionality may be needed if the ring hierarchy is deep.

The image browsing method as described for the embodiments disclosed above may advantageously be implemented as a computer program product which may be installed by a manufacturer, distributor, end-user, etc, in a mobile terminal's memory (e.g. memory 402 of FIG. 4). Such computer program will include program code that when executed by a processor in the mobile terminal (e.g. controller 400 of FIG. 4) will perform the image browser functionality described above.

Even if the digital object browser has been described above as a browser for digital images, it may alternatively be a browser for other types of digital objects, including but not limited to video sequences, text documents, spreadsheet documents, html (hypertext markup language) documents, wml (wireless markup language) documents or even audio sequences. The particulars of the second representation shown in the preview area will of course depend on the actual type of the document and may require processing which is special for the type in question. For instance, if the object is a html document, the processing required to provide a preview may involve interpreting the html code and presenting a compact, low-resolution version of the document specified by the html code in the preview area. For objects that are non-visual in nature, e.g. audio sequences, the first representation as well as the second representation will contain visual information that as clearly as possible conveys to the user a sense of the non-visual contents of the objects. For an audio sequence, this may for instance include presenting a song title, artist name, album name and/or duration, or parts of the lyrics, or even a subset of musical notes that defines a well-recognized part of the audio sequence (e.g. the chorus of a song).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus comprising:
   a controller;
   a display connected to the controller;
   an input device connected to said controller; and
   a digital object browser for browsing among a plurality of available digital objects, a first representation and a second representation of each of said plurality of digital objects being presentable on a display screen of said display;
   where said controller being adapted to cause said digital object browser to
      present said first representations of said plurality of digital objects along a predefined path on said display screen, the first representation of a focused one of said digital objects being shown in a focus area on said display screen and a perspective angle of each of the digital objects increases depending on a distance along the path from the focus area such that an angle between intersecting planes of one of said digital objects and the focused one of said digital objects increases depending on the distance along the path from the focus area and a visual overlap of each of the digital objects progressively increases depending on the distance along the path from the focus area;
      present, for said focused one of said digital objects, the second representation thereof in a preview area on said display screen; and
      in response to a user input given on said input device, perform a desired scrolling operation among the first representations presented, thereby shifting the positions of the first representations on said display screen along said path accordingly, updating said focus area to reflect a change in focus from said focused one of said digital objects to another digital object by presenting in said focus area the first representation of said another digital object, as well as updating said preview area correspondingly by presenting therein the second representation of said another digital object.

2. An apparatus as defined in claim 1, wherein the digital objects are images, the first representations are thumbnail versions of said images, and the second representation is a reduced version of the image whose thumbnail version is shown in said focus area.

3. An apparatus as defined in claim 2, wherein said reduced version is larger, in at least one of image size, resolution or color depth, than the corresponding thumbnail version.

4. An apparatus as defined in claim 1, wherein the first representation of said focused digital object is shown in a front view on said display screen, whereas the first representations of digital objects other than the focused one are shown as perspective views on said display screen.

5. An apparatus as defined in claim 1, wherein said predefined path follows a non-linear geometrical curve.

6. An apparatus as defined in claim 1, wherein said focus area on said display screen is fixed, i.e. has a static position on said display screen.

7. An apparatus as defined in claim 5, wherein said path is symmetrical around at least one symmetry axis and said static position of said focus area on said display screen is located at an intersection of said path and said symmetry axis.

8. An apparatus as defined in claim 1, wherein said controller is adapted, upon receiving a first type of user input from said input device, to cause scrolling of said first representations in a first direction along said path, and said controller is adapted, upon receiving a second type of user input from said input device, to cause scrolling of said first representations in a second direction along said path, said second direction being opposite to said first direction.

9. An apparatus as defined in claim 8, said controller being adapted, upon receiving a third type of user input from said input device, to cause presentation on said display screen of a menu having a plurality of menu options representing different available operations on said focused one of said digital objects.

10. An apparatus as defined in claim 8, wherein said input device comprises a multi-way input device such as a 4/5-way navigation key or a joystick, said first and second types of user input being first-way and second-way actuations of said multi-way input device.

11. An apparatus as defined in claim 1, wherein said controller is adapted to cause said digital object browser to present information associated with said focused one of said digital objects in a description area on said display screen.

12. An apparatus as defined in claim 1, in the form of a mobile phone adapted for use in a mobile telecommunications network.

13. An apparatus as defined in claim 1, in the form of a device selected from the group consisting of a digital notepad, a personal digital assistant and a hand-held computer.

14. An apparatus as defined in claim 1, the terminal comprising a local memory, wherein at least some of said plurality of available digital objects are stored in said local memory.

15. An apparatus as defined in claim 1, the terminal comprising a wireless communication interface to at least either a mobile tele-communications network or an external device, wherein at least some of said plurality of available digital objects are stored in said mobile telecommunications network or said external device and are accessible to said controller and said digital object browser through said wireless communication interface.

16. An apparatus as defined in claim 11, the digital objects having a location in a hierarchical or otherwise ordered storage structure, wherein the presented information associated with said focused one of said digital objects includes information about said focused object's location in the storage structure.

17. A method comprising:
presenting first representations of a plurality of digital objects along a predefined path on a display screen of a mobile terminal, the first representation of a focused one of said digital objects being shown in a focus area on said display screen;
presenting, for said focused one of said digital objects, a second representation thereof in a preview area on said display screen; and
in response to a user input, performing a desired scrolling operation among the first representations presented, thereby shifting the positions of the first representations on said display screen along said path accordingly where an angle between intersecting planes of one of said digital objects and the focused one of said digital objects increases depending on a distance along the path from the focus area and a visual overlap of each of the first representations of the digital objects progressively increases depending on the distance along the path from the focus area, updating said focus area to reflect a change in focus from said focused one of said digital objects to another digital object by presenting in said focus area the first representation of said another digital object, as well as updating said preview area correspondingly by presenting therein the second representation of said another digital object.

18. A computer program product embodied in a memory of a device comprising computer readable program code embodied in a computer readable medium for performing the method according to claim 17.

19. A mobile terminal having a controller, a display and an input device connected to said controller, and a digital object browser for browsing among a plurality of available digital objects, said controller being adapted to cause said digital object browser to
present a representation of each of said plurality of digital objects along a predefined path following a non-linear geometrical curve on said display screen, the representation of a focused one of said digital objects being shown in a focus area on said display screen, wherein the representation of said focused digital object is shown at a given size on said display screen, whereas the representations of digital objects other than the focused one are shown at sizes which decrease with a distance along said path from said focused digital object and an angle between intersecting planes of one of said digital objects and the focused one of said digital objects increases depending on the distance along the path from the focus area and a visual overlap of each of the digital objects progressively increases depending on the distance along the path from the focus area; and
in response to a user input given on said input device, perform a desired scrolling operation among the representations presented, thereby shifting the positions of the representations on said display screen along said path accordingly and changing focus from said focused one of said digital objects to another digital object.

20. A mobile terminal as defined in claim 19, wherein the digital objects are images and said representations are thumbnail versions of said images.

21. A mobile terminal as defined in claim 19, wherein said controller is adapted, upon receiving a first type of user input from said input device, to cause scrolling of said representations in a first direction along said path, and said controller is adapted, upon receiving a second type of user input from said input device, to cause scrolling of said representations in a second direction along said path, said second direction being opposite to said first direction.

22. A mobile terminal as defined in claim 21, said controller being adapted, upon receiving a third type of user input from said input device, to perform an operation on said focused one of said digital objects.

23. A mobile terminal as defined in claim 22, wherein said operation involves presenting a second representation of said focused one of said digital objects on said display screen.

24. A mobile terminal as defined in claim 19, said plurality of digital objects belonging to a given level in a hierarchical structure including at least one folder at said given level, wherein a representation of said at least one folder is included among said representations of said plurality of digital objects which are presented along said predefined path.

25. A mobile terminal as defined in claim 22, said plurality of digital objects belonging to a given level in a hierarchical structure including at least one folder at said given level, wherein a representation of said at least one folder is included among said representations of said plurality of digital objects which are presented along said predefined path, and wherein, if said folder is focused, said operation involves:
changing to a next level subordinate to said given level in said hierarchical structure; and
causing presentation on said display screen of digital objects included in said folder instead of said plurality of digital objects belonging to said given level.

26. A mobile terminal as defined in claim 19, wherein said controller is adapted to cause said digital object browser to present information associated with said focused one of said digital objects in a description area on said display screen.

27. A mobile terminal as defined in claim 19, wherein said controller is adapted to adjust a shape or size of said predefined path depending on a number of said plurality of available digital objects.

28. A mobile terminal as defined in claim 19, wherein said predefined path is endless.

29. A mobile terminal as defined in claim 19, in the form of a mobile phone adapted for use in a mobile telecommunications network.

30. A mobile terminal as defined in claim 19, in the form of a device selected from the group consisting of a digital notepad, a personal digital assistant and a hand-held computer.

31. A digital object browsing method for a mobile terminal having a display with a display screen, a representation of each of a plurality of available digital objects being presentable on said display screen, the method comprising:

presenting said representations of said plurality of digital objects along a predefined path following a non-linear geometrical curve on said display screen, the representation of a focused one of said digital objects being shown in a focus area on said display screen, wherein the representation of the focused digital object is shown at a given size on the display screen, whereas the representations of digital objects other than the focused one are shown at sizes which decrease with the distance along the path from the focused digital object and an angle between intersecting planes of one of said digital objects and the focused one of said digital objects increases depending on the distance along the path from the focus area and a visual overlap of each of the digital objects progressively increases depending on the distance along the path from the focus area; and in response to a user input, performing a desired scrolling operation among the representations presented, thereby shifting the positions of the representations on said display screen along said path accordingly and changing focus from said focused one of said digital objects to another digital object.

32. A computer program product embodied in a memory of a device comprising computer readable program code embodied in a computer readable medium for performing the method according to claim 31.

* * * * *